April 29, 1952  J. P. DE ROSE  2,594,882
ADJUSTABLE SEAT SUPPORT
Filed Dec. 26, 1947  3 Sheets-Sheet 2
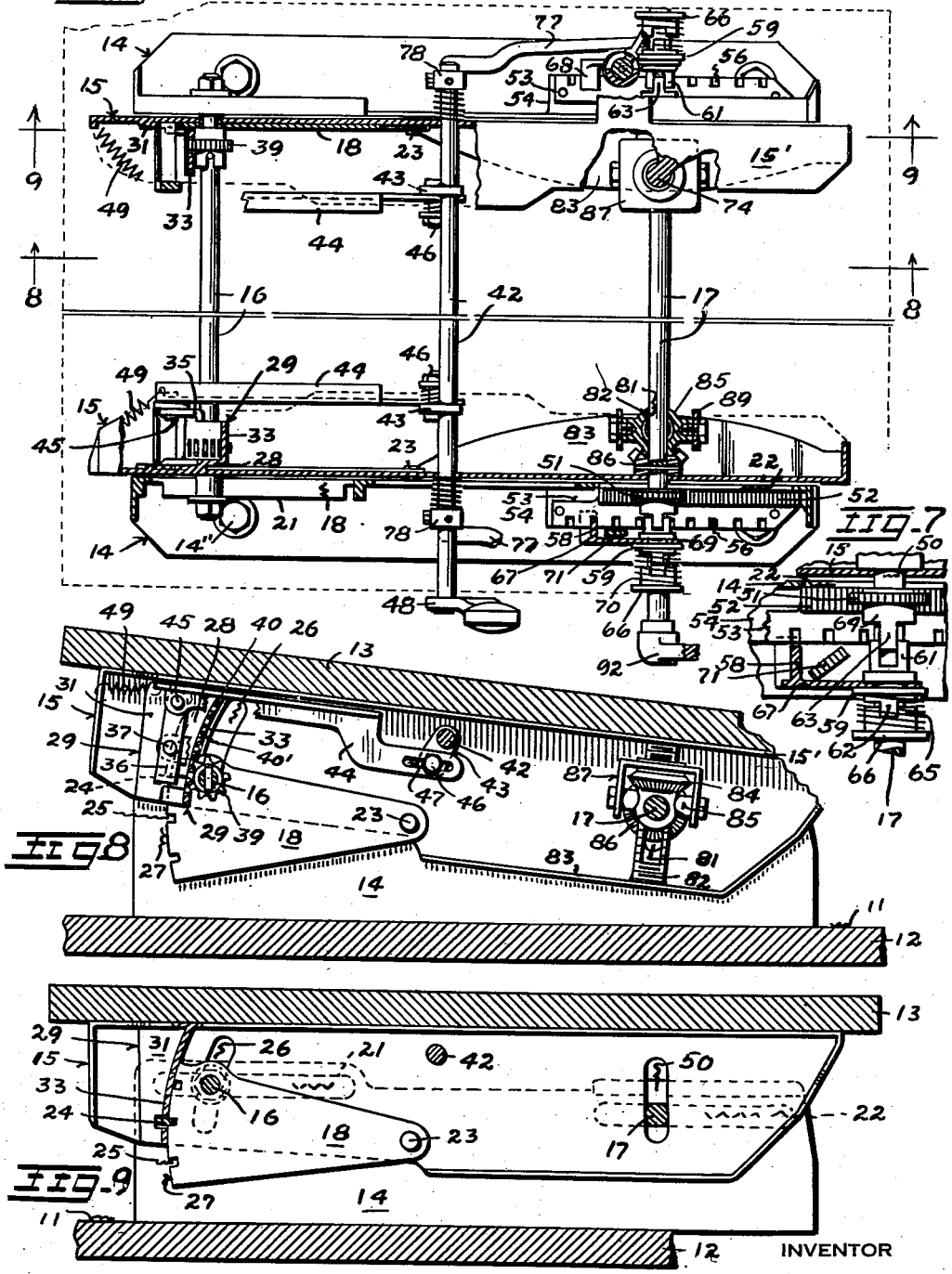
INVENTOR
JOHN P. DeROSE
BY Henry N. Young
ATTORNEY

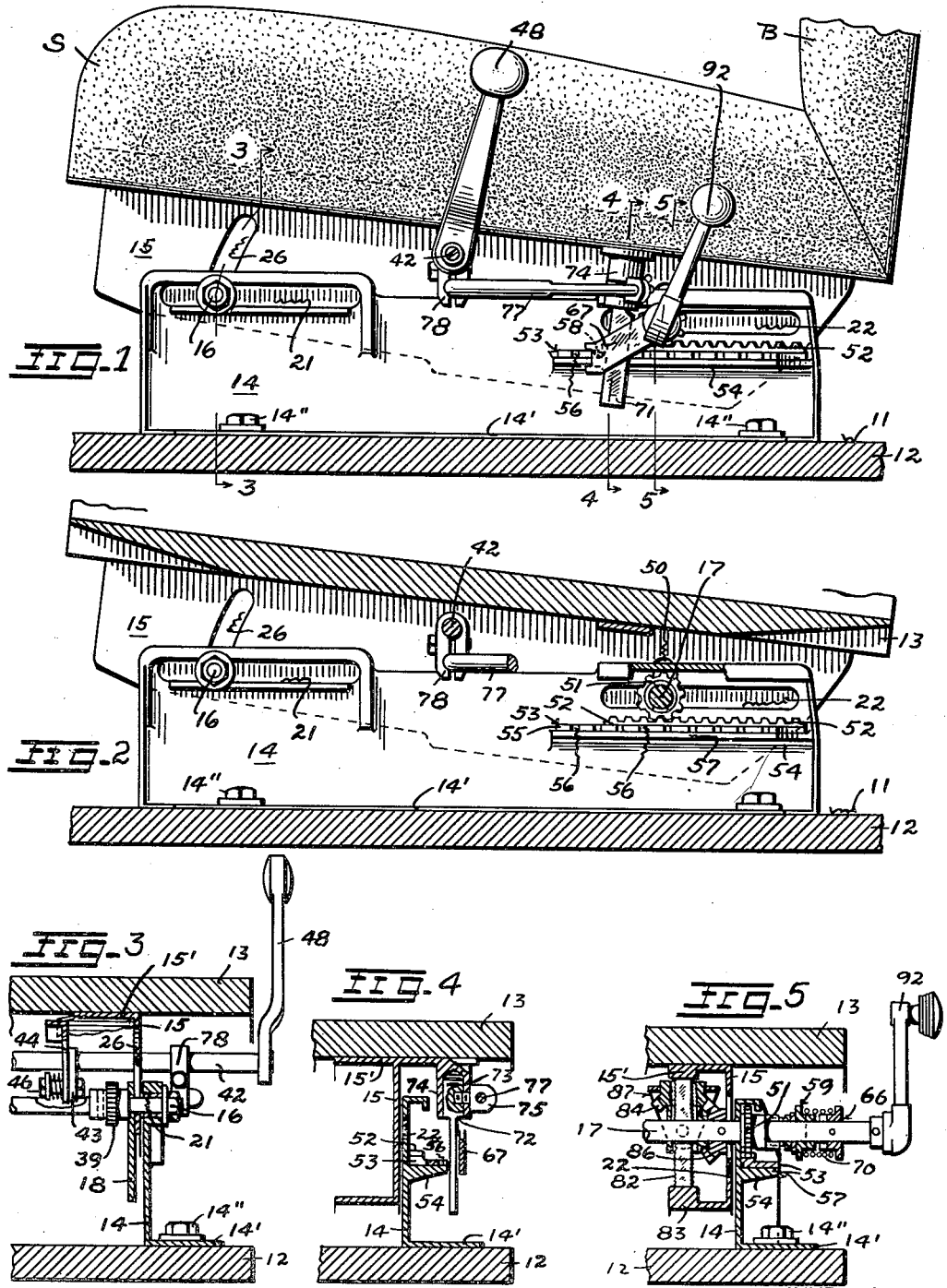

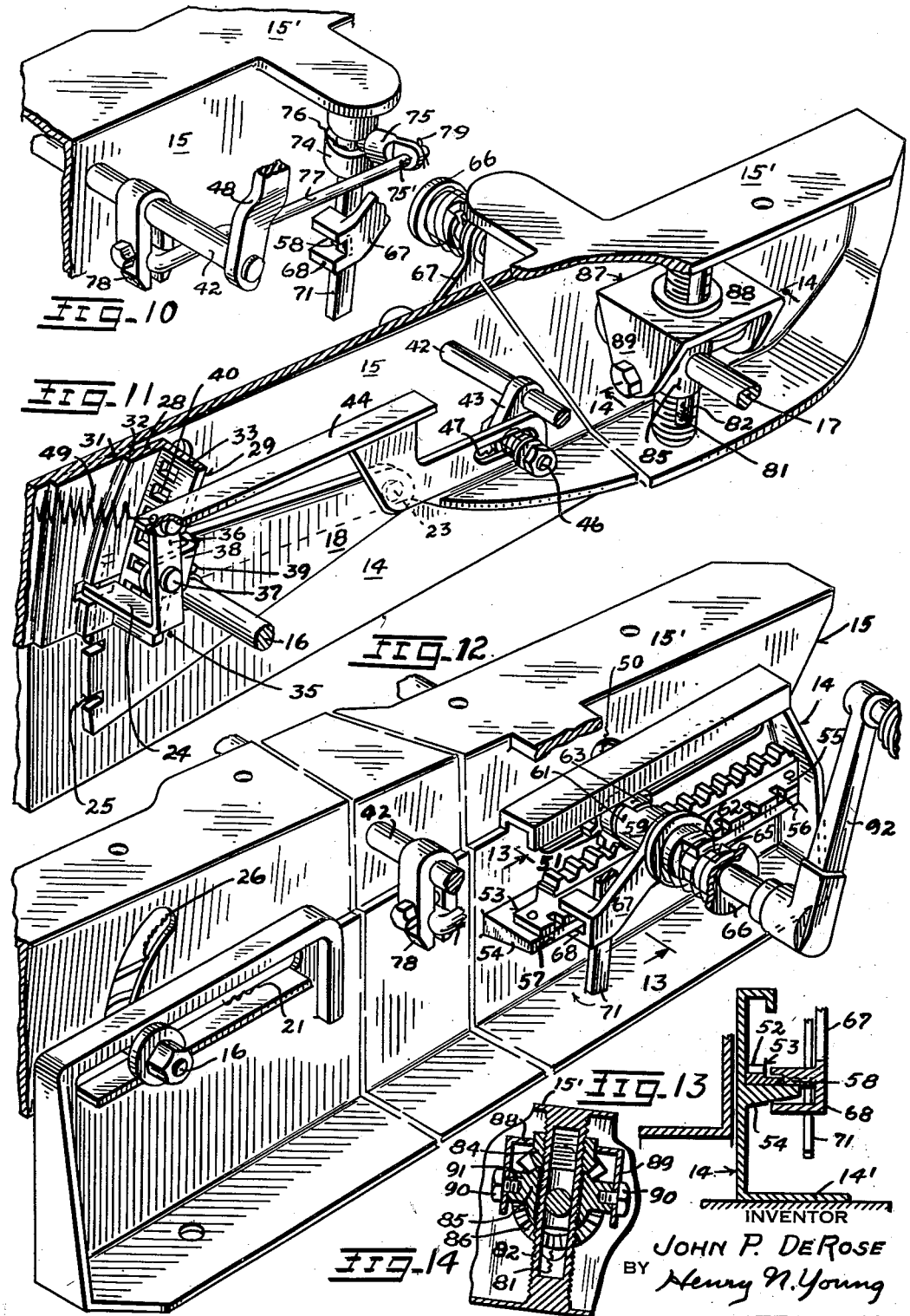

Patented Apr. 29, 1952

2,594,882

UNITED STATES PATENT OFFICE 2,594,882

ADJUSTABLE SEAT SUPPORT

John P. De Rose, Albany, Calif.

Application December 26, 1947, Serial No. 794,044

5 Claims. (Cl. 155—14)

1

The invention relates to adjustable supports for seats.

The general object is to provide an improved seat mounting which permits mutually independent height and/or angularity and/or fore-and-aft adjustments of the seat with respect to its base.

Another object is to provide an improved repositioning control for a seat which is supported at its opposite sides.

A further object is to provide a seat mounting of the character described which is of particularly simple and inexpensive structure.

The invention possesses other objects and features of advantage, some of which, with the foregoing, will be set forth or be apparent in the following description of a typical embodiment thereof, and in the accompanying drawings, in which, Figure 1 is a fragmentary left-side view of a seat-mounting structure embodying the features of the present invention and supporting a seat from a floor in set position.

Figure 2 is a fragmentary left-side view of the mounting with certain elements thereof broken away.

Figures 3 and 4 and 5 are fragmentary sections taken respectively at the broken lines 3—3 and 4—4 and 5—5 in Figure 1.

Figure 6 is a plan view of the seat-mounting structure, parts thereof being broken away at different levels.

Figure 7 is an enlarged fragmentary view of a portion of the showing of Figure 6, the cooperating elements being shown as mutually conditioned for a fore-and-aft seat adjustment.

Figure 8 is a sectional view taken at the line 8—8 in Figure 6.

Figure 9 is a sectional view taken at the line 9—9 in Figure 6, but has the disclosed parts arranged for the support of a seat in a different adjusted disposition than in Figure 8.

Figure 10 is an enlarged fragmentary perspective view of a portion of the showing of Figure 1.

Figure 11 is an enlarged fragmentary perspective view of the support assembly of Fig. 8.

Figure 12 is an enlarged broken-out perspective view of the support assembly of Figure 1, certain elements being broken away.

Figure 13 is an upright section through the line 13—13 in Figure 12.

Figure 14 is an upright section through the line 14—14 in Figure 11.

The features of present invention are shown as embodied in the structure of a seat unit which comprises a seat having a bottom S and a back B and mounted on an adjustable support structure having its base resting upon a supporting surface 11 such as that provided by a floor 12. The present seat is of a usual upholstered type having a rigid bottom plate or frame 13 for direct mounting on the adjustable support structure, the said support structure having been particularly designed for its installation for supporting a seat in a motor-driven vehicle for use by the operator of the vehicle, though generally applicable wherever its types of adjustment are advantageous.

The present seat support device generally comprises a pair of similar base members 14 for fixing to the floor 12 to extend upwardly therefrom beneath the different seat ends, a pair of similar members 15 for fixing to the seat bottom 13 to depend therefrom, and front and rear support rods or shafts 16 and 17 fixedly carried on and between one pair of members 14 or 15 and adjustably supported from the other pair of members 15 or 14 to provide the adjustable support of the seat from the base members 14. The present base members 14 comprise plates provided with flanges 14' extending transversely therefrom at their bottom edges to provide floor bearings for the plates and a means by which the plates may be secured to a floor 12 in relatively fixed and mutually parallel relation, as by bolts 14''. The members 15 comprise plates provided with transverse edge flanges 15' by which they may be secured to the seat bottom 13, as by screws through holes therein, for their simultaneous disposal opposite and adjacent the inner faces of the plates 14.

In the present structure, the rods 16 and 17 are arranged for direct supported engagement upon and along corresponding and horizontal bearing faces provided by the base plates 14 while they are carried on intermediate support devices mounted on the seat plates 15 for independent adjustments of the rods along upright slots provided in the latter plates. Near their upper edges the present base plates 14 are provided with corresponding forward and rear slots 21 and 22 which extend parallel to the base edges of the plates and constantly and slidably receive the support rods 16 and 17 respectively for the support of the seat on the bottom slot faces for its fore-and aft-adjustment, the slots 21 and 22 being of such lengths and so related that they determine the range of fore-and-aft adjustment.

For providing a desirable range of angularity adjustments of the seat, the rear slots 22 are slightly below the level of the front slots 21, said slots being conveniently shown and referred to as being horizontal, though they need be only substantially so in practice.

It will now be noted that the intermediate support devices for the rods 16 generally comprise elongated and similar flat members 18 which rotatively receive the support rod 16 near corresponding ends and are pivoted to the said plates 15 for swinging adjustment along the opposed plate faces about fixed hinge pins 23 engaging their other ends and preferably located centrally of the seat plates. Catch bolts or dogs 24 mounted on the plates 15 normally extend into transverse openings 25 of the members 18, there being a series of said openings 25 for selective engagement by each dog 24 and arranged in a generally upright arcuate line having the hinge pin at its center of curvature for the selective disposal of the openings 25 of the members 18 to receive the dogs for supporting the seat front at different heights, it being noted that the rod 16 extends freely through the seat plates 15 at arcuate slots 26 concentric with the hinge-pins 23.

As is particularly brought out in Figures 6 to 9 and 11, the support members 18 carrying the rod 16 are generally sector-shaped, with the pivot pins 23 engaging them at their apical ends and with their opposite free end portions bounded by arcuate end edges 27 and having their end portions adjacent the edges 27 engaged between the mutually opposed faces of guide plates 28 and the seat plates 15 for their confinement to swinging movements in planes along the opposed faces of the plates 15 which mount them. As shown, the members 29 providing the guide plates 28 for the links 18 are of mutually complementary structure and are each shaped from sheet material to provide a flat base portion 31 which is secured to the plate 15 in the plane of the member 18 beyond the members and carries the guide plates 28 on a transverse connecting portion or offset 32. The base portions 31 of the members 29 are suitably fixed against and to the seat plate 15, as by welding, and the free edges of the plates 28 are provided with outturned flanges 33 which, in the present instance, have their upper ends fixed to the top flanges 15' of the members 15.

By reference to Figures 8 and 11, it will be noted that each dog 24 comprises a terminal portion of one arm 34 of an L-shaped lever member 35 which has its other, and upwardly-extending, arm 36 intermediately pivoted on a fixed pivot pin 37 for rotation about an axis perpendicular to the plate for the movement of the dog toward and from the notched end 27 of the corresponding member 18. In the present structure, the pivot pin 37 is carried on an ear 38 extending from the outer edge of the flange 33.

It will now be noted that each flange 33 is arcuate, having the center of its arc circle at the hinge pin 23 for the member 18. The support rod 16 mounts pinions 39 opposite the flanges 33 and said flanges provide racks 40 with which the teeth of the pinions 39 are arranged to constantly engage; in this manner, the members 18 are held to corresponding positions relative to the plates 15 which mount them, and uniform adjustment of the seat height thereat is assured. In the present structure, each rack is provided as a series of holes 40' in the flange 33.

A control shaft 42 is journaled in and between the plates 15 near their top flanges and intermediate of their lengths, and said shaft is operative upon an appropriate rocking thereof from a normal set position to simultaneously disengage the dogs 24 from notches 25 of the support elements 21. In the present structure, radial arms 43 extend fixedly and in a common plane from the shaft 42 in the general planes of the dog-lever arms 36, and are connected to the free ends of the latter by link members 44 whereby a rocking of the shaft 42 from its normal position may rock the levers 35 to withdraw the dogs, and so permit an up or down adjustment of the front of the seat assembly. Pins 45 connect the link members 44 with the arms 36, and pins 46 extend from the shaft arms 43 through longitudinal slots 47 provided in the links 44; the arrangement is such that the links are operative to withdraw the dogs when the shaft 42 is rocked in solely one direction from its normal position, said shaft being provided at one end thereof beyond the seat side with a hand lever 48 for use in rocking it as required for effecting adjustments of the seat. Tension springs 49 extending from the forward ends of the links 44 to anchorages in the plates 15 constantly and yieldingly urge operative disposals of the dogs 24.

By reference to the rear support rod 17, which extends through the rearward support slots 22 on the base plate 14 and through straight upright slots 50 provided in the seat plates 15, it will be noted that this rod rotatably carries gears 51 which constantly mesh with corresponding teeth of horizontal racks 52 provided by members 53 mounted on outer shelf projections 54 of the base plates 14 at rearward points thereof and below the slots 22. The arrangement is essentially such that the seat is constrained to like movements of both ends during any fore-and-aft adjustments thereof. The racks 52 extend from base portions 55 of the members 53, and sets of dog-receiving notches 56 are provided in and along the outer edges of the base portions 55 which are shown as flush with the outer edges 57 of the shelves 54, dogs 58 being normally engaged in corresponding notches 56 in a manner to prevent fore-and-aft adjustments of the seat.

At both of its ends beyond the base plates 14, the rod 17 slidably mounts sleeve members 59 which are provided with clutch teeth 61 and 62 at their inner and outer ends respectively. The clutch teeth 61 are arranged to constantly interengage with clutch teeth 63 on the opposed ends of the hubs 64 of the gears 51, while the clutch teeth 62 are arranged to interengage with opposed clutch teeth 65 provided on collar members 66 which are fixed to the rod 17 outwardly of the sleeves 59 when the dogs 58 are withdrawn from the notches 56, whereby to provide for fore-and-aft seat adjustments when the rod 17 is rotated.

Arms 67 extend radially from the sleeves 59 in swiveled engagement therewith, and have terminal fork portions 68 directed toward the plates 14 and slidably receiving the outer edge portions of the shelves 54 and the overlying base parts 55 of the members 53 between their arms. As particularly shown, each sleeve member 59 is formed intermediately thereof to provide a coaxial groove 69 which is defined between outer and inner flanges thereof, and the arms 67 are mounted on the sleeves 59 at said grooves, with the reduced sleeve portions at the groove bottoms rotatively extending through complementary holes in the arms. The engagement of the arms 67 in the grooves 69 is such as to prevent their appreciable rocking axially of the rod 17. Helical compression springs 70 encircling the rod 17 are engaged between the outer ends of the sleeves 59 and the collars 66 on the rod 17 to yieldingly urge and normally maintain a disengagement of the clutch teeth 62 and 65 of the sleeves 59 and collars 66 respectively.

It will now be noted that the dogs 58 extend downwardly from the upper arms of the forks 68 for normal selective engagement in corresponding notches 56, and means are provided for simultaneously displacing the forks 68 to release the seat for its fore-and-aft adjustment. As is particularly brought out in Figures 1 and 4 and 10 and 12 and 13, the dog-releasing means essentially comprises flat bar elements 71 which are normally engaged flat between the shelf edges 57 and the opposed arms 67 for rotation about their longitudinal axis to operate as cams to displace the sleeves 59 for removing the dogs 58 from the notches 56 while interengaging the outer sleeve teeth 62 with the teeth 65 of the collar 66, the inner sleeve teeth 61 maintaining their interengaged relation with the teeth of the gears 51.

The present bars 71 depend rigidly and coaxially from cylindrical members 72 which function as supporting heads for them and are oscillatably engaged in socket 73 provided at the ends of transverse integral projections 74 at the tops of the plates 15. As is particularly brought out in Figures 4 and 10, arms 75 extend radially from the heads 72 through circumferential slots 76 in the socket sides, and have their outer ends connected by links 77 with radial arms 78 mounted on the control shaft 42, said arms providing the swivelled support of the bars 71 from the sockets 73. The links 77 are loosely slidable in holes 75' of the arms 75 and mount keys 79 at their extremities for preventing their withdrawal through the holes 75'. The arms 78 are of a clamp-on type and provide more or less universal connections with the link ends thereat whereby they may be adjusted circumferentially and axially of the shaft 42 and the necessary swinging freedom is provided for the links 77. When it is desired to effect a fore-and-aft adjustment of the seat, a rearward rocking of the hand lever 48 is arranged to effect the desired camming rotation of the member 71 to release the dogs 58, it being noted that the forward swinging of the hand lever 48 to release the dogs 24 at the front of the seat is permitted without actuating the bars 71 by reason of the permitted sliding of the links 77 in the holes 75'.

It will now be noted that the rear support rod 17 extends through diametric slots 81 provided in externally threaded members 82 which are fixed to and between the flanges 15' of the plates 15 and corresponding projections 83 extending toward each other at the bottoms of the plates, the axis of the members 82 being perpendicular to the flanges, and the members being welded or otherwise fixed in place. Nut members 84 comprising like bevel gears are threadedly carried on the members 82 above tubular block members 85 which rotatively receive the rod 17 diametrically therethrough and are arranged to constantly engage like bevel gears 86 fixed on the rod. The tops of the blocks 85 are complementary to the opposed ends of the bevel gears 84, and the upper ends of the latter gears are engaged by cage members 87, said members having flat portions 88 rotatively receiving the gear hub, and down-turned ears 89 which are fixed to the blocks 85 by means of stud bolts 90 engaged in bosses 91 which extend radially and oppositely from the blocks 85; the arrangement is essentially such that the rod 17 supports the seat plates 15 through intermediate support assemblies comprising the sets of blocks 85 and cages 87 and nut members 84 and members 82.

At an extending end thereof, the rod 17 has a hand crank 92 fixed to it for use in effecting its rotation; the crank 92 is preferably provided at the same side of the seat as is the hand lever 48, as is illustrated. Independently of the relation of the movable clutch sleeves 59 to the corresponding clutch collars 66, a rotation of the rod 17 by means of the crank 92 is arranged to actuate the nut gears 84 through the bevel gears 86 on the rod for adjusting the spacing of the rod with respect to the top flanges 15' of the plates 15 and the seat carried thereby, whereby a height adjustment of the seat may be effected thereat. While the clutch sleeves 59 are disengaged from the corresponding clutch collars 66 as is normal, a turning of the rod will provide only a height adjustment for the seat.

When the clutch sleeve 59 has its teeth 62 interengaged with the clutch teeth 65 of the corresponding clutch collar 66 on the rod 17 through the appropriate rocking of the rod 16 by use of the hand lever 48 thereon, a rotation of the rod 17 is arranged to simultaneously effect both height and fore-and-aft adjustments of the seat on and with respect to the base plates 14 whereby such adjustments are arranged to occur simultaneously when the rod 17 is rotated. It is to be noted, however, that it requires only approximately one revolution of the rod 17 to move the seat through its complete for-and-aft adjustment range when the clutch sleeves 59 are interengaged by the clutch collars 66, and that the pitch of the screw members 82 is relatively low whereby a large number of revolutions thereof is required to move the nut gears 84 through their full range of adjustment; the present ratio is approximately 1 to 20 whereby height adjustments made incidentally while fore-and-aft adjustments are made are negligible, for, in effect making these adjustments mutually independent.

While I have particularly shown installations of different positioning control devices at the front and rear of the seat, it will also be understood that these devices might be reversedly applied with respect to the rods 16 and 17.

From the foregoing description, taken in connection with the accompanying drawings, the advantages of the construction and use of the present adjustable seat support will be readily understood by those skilled in the art to which the invention appertains. While I have described the features and use of an arrangement which I now consider a preferred embodiment of my invention, I desire to have it understood that the showing is primarily illustrative, and that such changes may be made, when desired, as fall within the scope of the following claims:

1. In a seat-supporting means, a base member disposed beneath the seat, a member depending from the seat in fixed relation thereto, one of said base and seat members being provided with a horizontal fore-and-aft support face, a support element having a cylindrical portion horizontal and engaging across said support face and laterally slidable along said face, a member carrying said element for rotation about the axis of its cylindrical portion, a nut member supportedly engaging said element-carrying member, an upright threaded member mounting said nut and fixed on the other of said base and seat members, and a gear means connecting the nut and element whereby a rotation of the element is operative to effect a height-adjusting movement of the element-supporting member along the threaded member.

2. A structure in accordance with claim 1 having the threaded member provided with a longitudinal slot extending diametrically therethrough and freely receiving the element.

3. A structure in accordance with claim 1 provided with a crank arm operative to rotate the element about its axis for effecting an adjustment of the element-carrying member along the threaded member.

4. A structure in accordance with claim 1 wherein the member providing the support face provides a horizontal rack extending in a fore-and-aft direction and parallel to the support face, and the said rotatable element mounts a spur gear for rotation with the element and constantly engaging the rack.

5. A structure in accordance with claim 1 having the gear means comprising a bevel gear fixed on the support element for rotation therewith, and a bevel gear provided on the nut for rotation therewith and engaged by the first gear.

JOHN P. DE ROSE.

REFERENCES CITED

The following references are of record in the file of this patent:

UNITED STATES PATENTS

| Number | Name | Date |
| --- | --- | --- |
| 1,446,833 | Carlson | Feb. 27, 1923 |
| 1,957,785 | Knapp | May 8, 1934 |
| 2,099,107 | Fleming | Nov. 16, 1937 |
| 2,298,351 | DeRose | Oct. 13, 1942 |
| 2,407,771 | DeRose | Sept. 17, 1946 |
| 2,429,017 | DeRose | Oct. 14, 1947 |